United States Patent
Consola et al.

(10) Patent No.: US 10,118,711 B2
(45) Date of Patent: Nov. 6, 2018

(54) METHOD OF CONTROLLING THE THRUST OF THE JETS OF AN AIRCRAFT DURING THE TAKEOFF PHASE, CONTROL DEVICE AND AIRCRAFT CORRESPONDING THERETO

(71) Applicants: AIRBUS OPERATIONS (S.A.S.), Toulouse (FR); AIRBUS (S.A.S.), Toulouse (FR)

(72) Inventors: Cédric Consola, Toulouse (FR); Olivier Blusson, Toulouse (FR); Jean-Philippe Sabathier, Bruguieres (FR)

(73) Assignees: Airbus Operations (S.A.S.), Toulouse (FR); Airbus (S.A.S.), Biagnac (FR)

( * ) Notice: Subject to any disclaimer, the term of this patent is extended or adjusted under 35 U.S.C. 154(b) by 79 days.

(21) Appl. No.: 15/359,528

(22) Filed: Nov. 22, 2016

(65) Prior Publication Data
US 2017/0152054 A1 Jun. 1, 2017

(30) Foreign Application Priority Data
Nov. 27, 2015 (FR) ...................................... 15 61488

(51) Int. Cl.
*B64D 31/06* (2006.01)
(52) U.S. Cl.
CPC ................................... *B64D 31/06* (2013.01)
(58) Field of Classification Search
CPC .................................................... B64D 31/06
See application file for complete search history.

(56) References Cited

U.S. PATENT DOCUMENTS

| | | | | |
|---|---|---|---|---|
| 2010/0305825 | A1* | 12/2010 | Fernandez | B64D 31/04 701/99 |
| 2011/0093141 | A1* | 4/2011 | Alcantara | G05D 1/0661 701/15 |
| 2011/0184623 | A1 | 7/2011 | De Boer | |
| 2013/0238173 | A1* | 9/2013 | Burns | G08G 5/0021 701/15 |
| 2016/0207633 | A1* | 7/2016 | McWaters | B64D 27/04 |

FOREIGN PATENT DOCUMENTS

WO WO 2012/148398 A1 11/2012

OTHER PUBLICATIONS

French Search Report for Application No. 151488 dated Jul. 13, 2016.

* cited by examiner

*Primary Examiner* — Thomas Ingram
(74) *Attorney, Agent, or Firm* — Jenkins, Wilson, Taylor & Hunt, P.A.

(57) ABSTRACT

The disclosure herein relates to a method of controlling the thrust of the jets of a multi-jet aircraft, during the aircraft takeoff phase, which successively comprises a first step of controlling the jets to a first thrust level, until the aircraft reaches a first predetermined speed, and a second step of controlling the jets to a second thrust level, less than the first thrust level, when the aircraft exhibits a speed greater than the first predetermined speed, the first predetermined speed being less than the minimum ground control speed of the aircraft when the jets are at the second thrust level.

7 Claims, 4 Drawing Sheets

METHOD OF CONTROLLING THE THRUST OF THE JETS OF AN AIRCRAFT DURING THE TAKEOFF PHASE, CONTROL DEVICE AND AIRCRAFT CORRESPONDING THERETO

CROSS-REFERENCE TO RELATED APPLICATION

This application claims the benefit of and priority to French patent application number 15 61488 filed on Nov. 27, 2015, the entire disclosure of which is incorporated by reference herein.

TECHNICAL FIELD

The disclosure herein pertains to a method of controlling the thrust of the jets of an aircraft making it possible to optimize the performance of the aircraft on takeoff, to a control device allowing the implementation of this method, and to an aircraft comprising such a control device.

BACKGROUND

In order to take off, a multi-jet commercial aircraft accelerates, by rolling on the ground, from a stopped position until it takes off from the ground.

In the course of this acceleration, the aircraft firstly reaches its minimum ground control speed $V_{MCG}$, which is the minimum speed necessary for the aircraft to remain laterally controllable by the pilot, should there be a fault with of one of its jets. By continuing its acceleration, the aircraft reaches its decision speed, or critical speed $V_1$, below which the pilot may decide to interrupt the takeoff, and above which the pilot is compelled to continue the takeoff. This critical speed $V_1$ is necessarily greater than the minimum ground control speed $V_{MCG}$ but it may, in certain cases, be very close to the latter. To avoid exiting the runway should the takeoff be interrupted, the aircraft must be capable of accelerating to its critical speed $V_1$, and then of braking to a complete stop, while traveling a distance, designated by the English expression "Accelerate-Stop Distance" or by the acronym "ASD", which must be less than the length of the runway available. This available runway length is sometimes designated by the English expression "Accelerate-Stop Distance Available" or by the acronym "ASDA". It may in certain cases be greater than the length of the runway itself, when the runway is followed by an extension on which the aircraft can travel or roll under exceptional conditions.

By continuing its acceleration after having exceeded the critical speed $V_1$, the aircraft reaches its rotation speed $V_R$. When the aircraft reaches this speed, the pilot acts on the control surfaces to make the aircraft take off.

The minimum ground control speed $V_{MCG}$, the critical speed $V_1$ and the rotation speed $V_R$ are determined, in accordance with regulatory requirements, as a function of measurements performed during trials of the aircraft and of parameters such as the maximum weight of the aircraft on takeoff (often designated by the English expression "Maximum Take Off Weight" or by the acronym "MTOW"), the thrust power of the jets of the aircraft, the length of the takeoff runway and the atmospheric conditions of the day (temperature, pressure).

When the takeoff runway is relatively short, the ASD distance must be reduced, with respect to the ASD distance used on a long runway, in order to remain less than the available runway length. This reduction in the ASD distance can be obtained by decreasing the maximum weight of the aircraft on takeoff MTOW or by decreasing the critical speed $V_1$.

Decreasing the maximum weight on takeoff MTOW makes it necessary to reduce the quantity of fuel or to reduce the useful weight transported. This decrease affects the profitability of the flight and is therefore avoided as far as possible. One seeks on the contrary, in general, to increase this weight.

Decreasing the critical speed $V_1$ often makes it necessary, when the takeoff runway is short, to reduce the minimum ground control speed $V_{MCG}$. This decrease can be obtained by reducing the level of the thrust of the jets. Indeed, with a reduced thrust value (called by the English expression "derated thrust"), the minimum ground control speed $V_{MCG}$ is reduced, and the aircraft is more easily controllable in case of a fault with one of its jets. The thrust control lever for the jets of an aircraft thus comprises a control making it possible to reduce the thrust, according to a desired reduction rate.

On certain takeoff runways of short length, the maximum weight on takeoff MTOW can therefore be more significant with a reduced thrust of the jets than with the nominal thrust of the jets. However, there are still configurations, on takeoff runways of short length, in which the use of the reduced thrust of the jets is not sufficient to avoid limitations of the maximum weight on takeoff MTOW, and therefore of the performance of the aircraft on takeoff.

SUMMARY

The description hereinafter presents a control method, and a device making it possible to implement the same, which remedy at least some of the drawbacks of the prior art.

In particular, an objective of this method is to allow an increase in the maximum weight on takeoff of a commercial aircraft, when the overly short length of the takeoff runway limits this weight.

These objectives, as well as others which will appear more clearly subsequently, are achieved with the aid of a method of controlling the thrust of the jets of a multi-jet aircraft, during the aircraft takeoff phase, which comprises the following successive steps:
  a first step of controlling the jets to a first thrust level P1, until the aircraft reaches a first predetermined speed $V_A$; and
  a second step of controlling the jets to a second thrust level P2, less than the first thrust level P1, when the aircraft exhibits a speed greater than the first predetermined speed $V_A$;
  the first predetermined speed $V_A$ being chosen to be less than the minimum ground control speed $V_{MCG}$ of the aircraft when the jets are at the second thrust level P2.

According to a preferred embodiment, the control method comprises a third step of controlling the jets to a third thrust level P3, greater than the second thrust level P2, when the aircraft exhibits a speed greater than a second predetermined speed $V_B$, the second predetermined speed $V_B$ being chosen to be greater than the minimum ground control speed $V_{MCG}$ of the aircraft when the jets are at the third thrust level P3.

Advantageously, the third thrust level P3 is equal to the first thrust level P1.

Preferably, the first thrust level P1 is equal to the maximum thrust level that can be obtained by the pilot.

Preferentially, the second thrust level P2 lies between 80% and 95% of the first thrust level P1.

The disclosure herein also relates to a device for controlling the thrust of the jets of a multi-jet aircraft, during the aircraft takeoff phase, comprising a computer onboard the aircraft and able or configured to control the thrust level of the jets of the aircraft, which comprises a computational program, implemented by the computer, and able or configured to control the thrust level of the jets of the aircraft according to the method described hereinabove.

The disclosure herein also relates to a multi-jet aircraft, comprising a device such as described hereinabove.

BRIEF DESCRIPTION OF THE DRAWINGS

Other characteristics and advantages will emerge from the following description of the disclosure herein, which description is given solely by way of example, with regard to the appended drawings among which.

DETAILED DESCRIPTION

Figure 1:
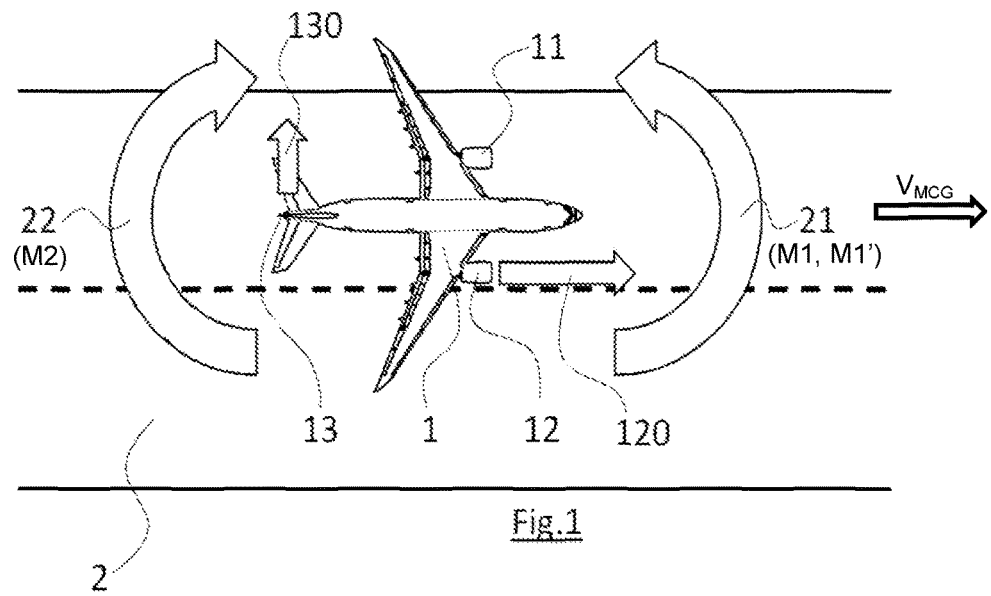
FIG. 1 is a schematic representation of an aircraft undergoing a fault with a jet, during its acceleration for takeoff.

FIG. 1 schematically represents an aircraft 1 equipped with two jets 11 and 12 and rolling on a runway 2, when its jet 11 stops unexpectedly. The thrust of the jet 12, represented by the arrow 120, produces a moment M1 which then tends to make the aircraft swivel as represented by the arrow 21, and therefore to make it deviate from the runway 2. The pilot then compensates this rotation by acting on the rudder 13 of the aircraft so as to generate a force represented by the arrow 130, which produces a moment M2 tending to make the aircraft swivel as represented by the arrow 22. The drift produced by the rudder 13 is dependent on the speed of movement of the aircraft 1.

The lateral motion of the aircraft can then be controlled by the pilot only if the moment M2 is at least equal to the moment M1, thereby implying that the speed of movement of the aircraft 1 is greater than a minimum ground control speed, denoted $V_{MCG}$, which is determined especially as a function of results of trials of the aircraft, and of the thrust of each jet 11 and 12.

Indeed, when the jet 12, operating during the fault with the jet 11, exerts a lower thrust, this thrust produces a lower moment M1'. The minimum ground control speed $V_{MCG}$ necessary in order for the drift to produce a moment compensating this moment M1' is then lower.

Figure 2:
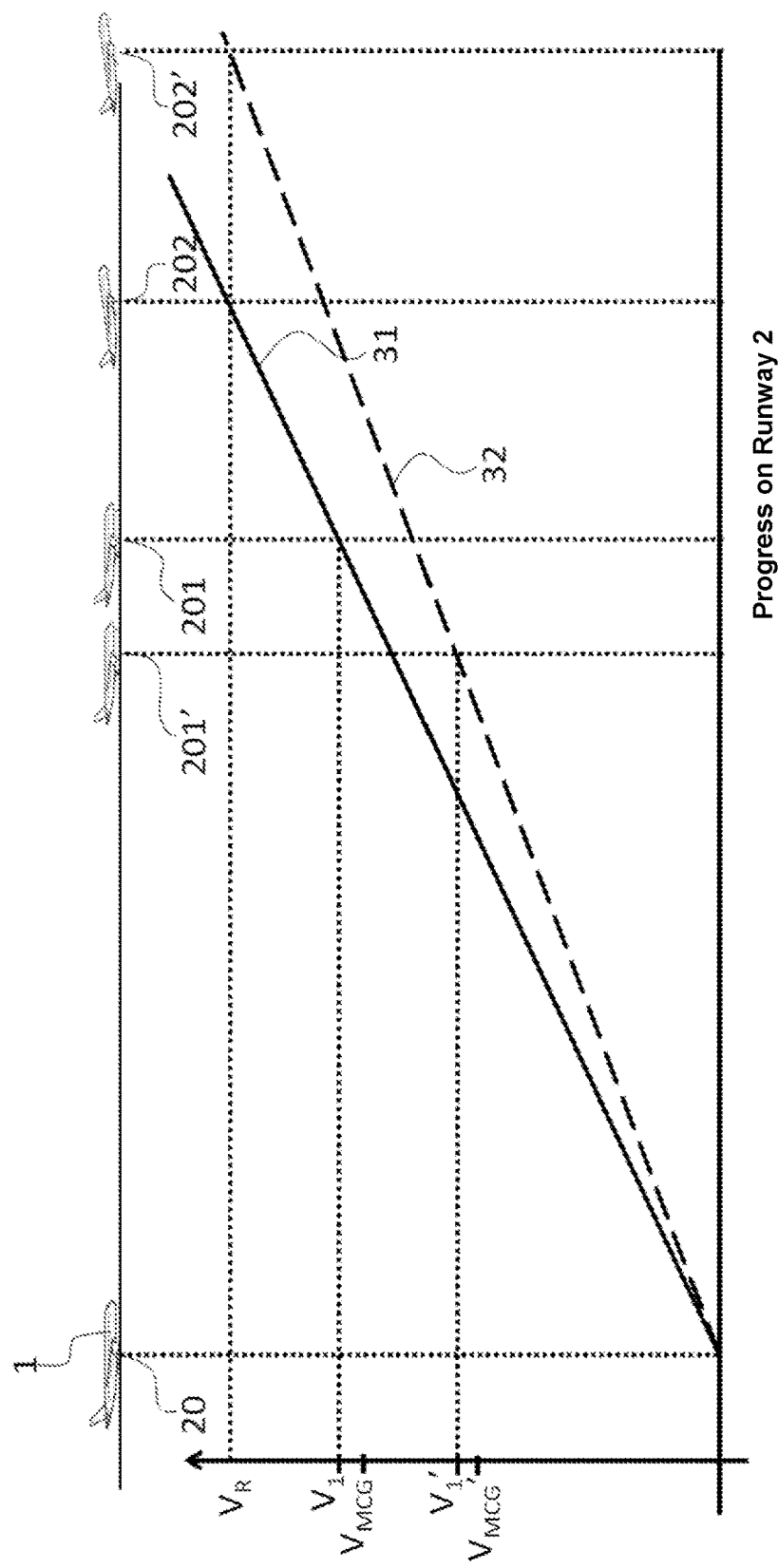
FIG. 2 is a schematic representation of an aircraft accelerating on a takeoff runway and of the associated speeds, for two thrust levels of the jets.

FIG. 2 schematically represents the aircraft 1 in several positions on the takeoff runway 2, and the speeds of this aircraft in the course of its progress on the runway, when both its jets are operating normally. The distance traveled by the aircraft 1 on the takeoff runway is represented as abscissa, and its speed is represented as ordinate. In the position 20, the aircraft 1 is stationary. It accelerates subsequently, by virtue of the thrust of its jets.

When the thrust of its jets is the nominal thrust (usually designated by the English expression "Take Off/Go Around" or by the acronym TO/GA), the speed of the aircraft increases, as it moves along, according to the curve 31. It reaches the critical speed $V_1$, necessarily greater than the minimum ground control speed $V_{MCG}$, when the aircraft is in the position 201, and then reaches the rotation speed $V_R$, at which the pilot makes the aircraft take off, when the aircraft reaches the position 202.

When the thrust of the jets is reduced with respect to the nominal thrust, the speed of the aircraft increases, as it moves along, according to the curve 32. Because of the lower thrust of the jets, the minimum ground control speed is reduced to the value denoted $V_{MCG}'$, thereby making it possible to reduce the critical speed to the value denoted $V_1'$, less than $V_1$. The aircraft reaches this critical speed $V_1'$, when the aircraft is in the position 201', and then reaches the rotation speed $V_R$ when the aircraft reaches the position 202'. The runway distance traveled to reach the critical speed being lower when the thrust is reduced, the ASD distance is reduced. In the case where this ASD distance conditions the runway length required, the length of the takeoff runway can be reduced. On a short runway, making it necessary to reduce the ASD distance, the use of reduced thrust therefore makes it possible to increase the maximum weight on takeoff MTOW.

Figure 4:
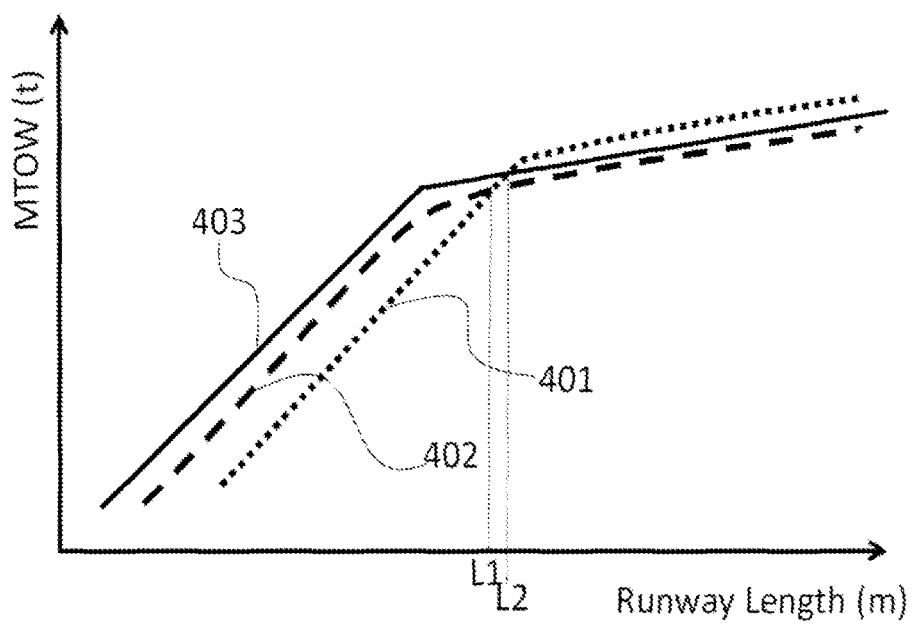
FIG. 4 is a graph illustrating, for a given aircraft, the maximum weight on takeoff as a function of the available runway length, for several configurations.

FIG. 4 represents curves illustrating this increase, for given conditions, especially of altitude and of temperature, and for a given aircraft. The graph of this figure shows, as abscissa, the available runway length, denoted by the English expression "Runway Length" and expressed in meters, and as ordinate the maximum weight on takeoff, denoted MTOW and expressed in tonnes. Curve 401 represents the maximum weight on takeoff MTOW of a commercial aircraft, as a function of the length of the takeoff runway, when the thrust of the jets is nominal (TO/GA). Curve 402 represents the maximum weight on takeoff MTOW of this aircraft, as a function of the runway length, when the thrust of the jets is reduced with respect to the nominal thrust.

According to these curves, when the runway length is less than a length L1, the maximum weight on takeoff MTOW is larger with the reduced thrust than with the nominal thrust. On the other hand, for a larger runway length, the maximum weight on takeoff is greater with the nominal thrust. Indeed, for a short runway, the maximum weight on takeoff MTOW is limited mainly by constraints related to the minimum ground control speed $V_{MCG}$. For a longer runway, the maximum weight on takeoff MTOW is limited by other factors, and the decrease in the minimum control speed $V_{MCG}$ does not enable it to be increased.

To optimize the maximum weight of the aircraft on takeoff MTOW, provision is made, according to an embodiment of the disclosure herein, to control the thrust of the jets according to a method which modifies the thrust level in the course of the aircraft's acceleration phase for takeoff.

Figure 3:
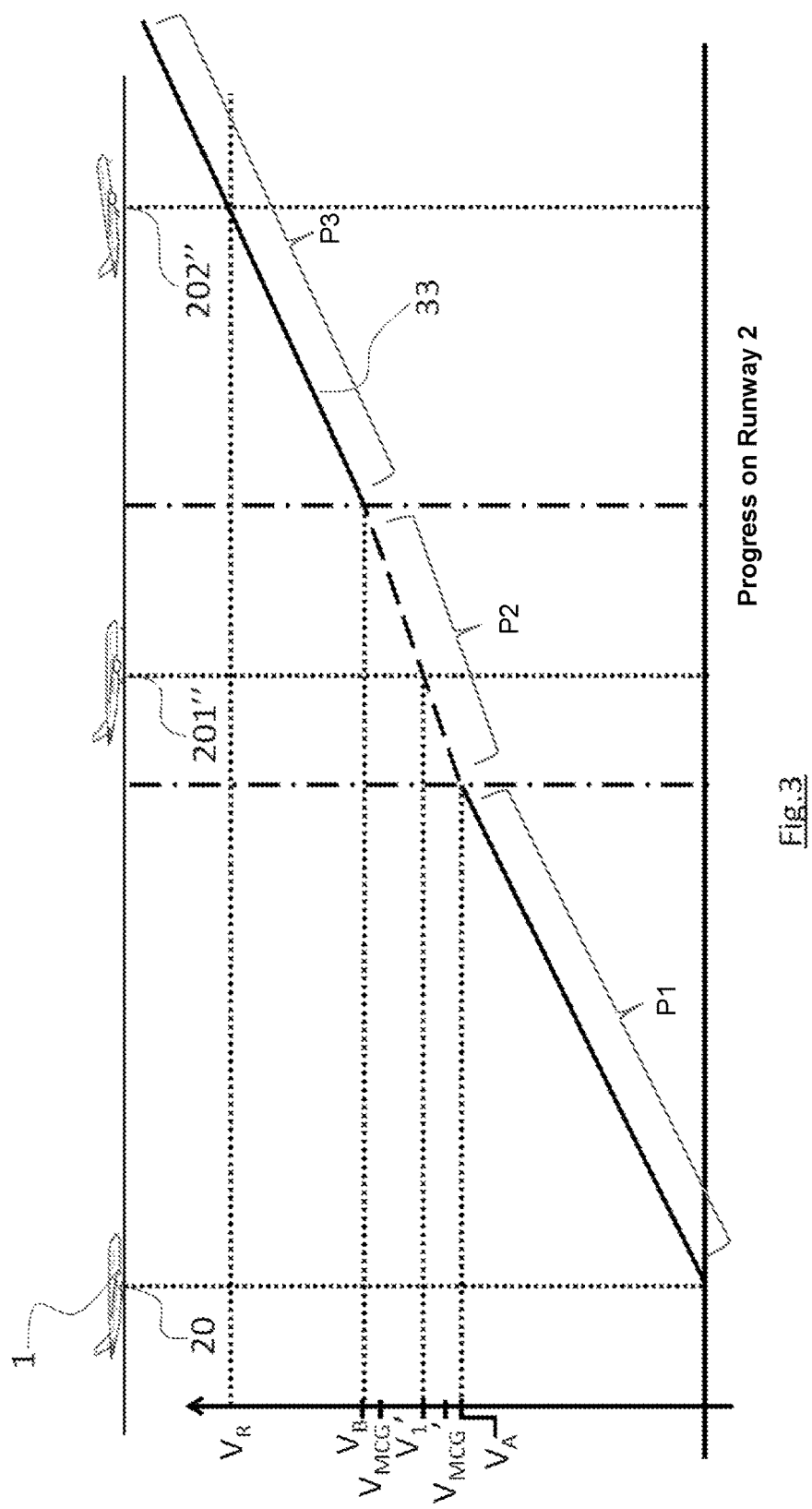
FIG. 3 is a schematic representation of an aircraft accelerating on a takeoff runway and of the associated speeds, during the implementation of a method of controlling the thrust of the jets according to an embodiment of the disclosure herein.

FIG. 3 schematically represents the aircraft 1, equipped with a device for controlling the thrust allowing the implementation of this method, in several positions on the takeoff runway 2, and the speeds of this aircraft in the course of its progress on the runway. The distance traveled by the aircraft on the takeoff runway is represented as abscissa, and its speed is represented as ordinate. In the position 20, the aircraft 1 is stationary. It accelerates subsequently, by virtue of the thrust of its jets.

At the start of the acceleration, the control device maintains the thrust of the jets at a high level P1, preferably at the nominal thrust TO/GA. The speed of the aircraft increases, according to curve 33, until it reaches a speed $V_A$. When the aircraft reaches this speed, the thrust control device decreases the thrust to a reduced level P2, less than the level P1.

A minimum ground control speed $V_{MCG}'$ is associated with the thrust level P2. P2 being less than P1, this speed $V_{MCG}'$ is less than the minimum ground control speed $V_{MCG}$ associated with the thrust level P1. The speed $V_A$ is, according to the disclosure herein, chosen to be less than the speed $V_{MCG}'$ associated with the thrust level P2. More precisely, the speed $V_A$ is chosen in such a way that the thrust level of the jets is equal to $P_2$ before the aircraft has reached the speed $V_{MCG}'$, or at the same moment. Thus, the thrust P1 (in practice, the nominal thrust TO/GA) is used at the start of the acceleration of the aircraft, so that this acceleration is higher. On approaching the minimum ground control speed of the aircraft, the thrust decreases, so as to decrease the value of the minimum ground control speed. The aircraft therefore reaches its minimum ground control speed in a shorter distance than in the prior art, insofar as its acceleration can be maximal over almost all of this distance, and that the speed to be reached is reduced as in the prior art solutions implementing a reduced thrust.

The minimum ground control speed being reduced, it is possible to choose a value of the critical speed V1' which is reduced. Thus, the distance traveled by the aircraft up to the position 201", where it reaches its critical speed V1' is shorter, in the embodiment illustrated by FIG. 3, than in the prior art solutions illustrated by FIG. 2, thereby making it possible to reduce the ASD distance without modifying the maximum weight on takeoff MTOW. In FIG. 4, curve 403 represents the maximum weight on takeoff MTOW of the aircraft, as a function of the runway length, when the thrust of the jets is controlled according to the control method according to the disclosure herein. As shown by this curve, the use of such a method of controlling the thrust of the jets makes it possible to increase the maximum weight on takeoff MTOW, with respect to the solutions used in the prior art, when the runway is relatively short, here less than a length L2.

According to a possible embodiment, the device for controlling the jets maintains the thrust of the jets at a reduced level with respect to their nominal thrust, during the rest of the takeoff procedure.

According to another particularly advantageous embodiment, which is represented by FIG. 3, the device for controlling the jets again increases the thrust of the jets to a level P3 when the aircraft reaches a speed $V_B$ greater than the minimum control speed $V_{MCG}$ associated with this thrust level P3 of the jets. This thrust level P3 is greater than the level P2 and may be, in the embodiment represented by FIG. 3, equal to the thrust level P1 and preferentially equal to the nominal thrust level TO/GA. Thus, in this case, the reduction in the thrust of the jets occurs only when the speed of the aircraft is close to the critical speed V1. The aircraft benefits in this case, during the larger part of the takeoff phase, from the nominal thrust TO/GA, and the rotation speed $V_R$ is reached at a position 202", in a shorter distance than when the thrust is reduced throughout the takeoff phase.

In the description presented hereinabove, the jets apply a constant thrust level P1 from the stopped position of the aircraft until it reaches the predetermined speed $V_A$, and a constant thrust level P2 above this predetermined speed $V_A$ and until it reaches a third predetermined speed $V_B$. In the actual application of these embodiments, it is however possible, without departing from the scope of the disclosure herein, for the thrust level to vary slightly around this value P1, below the speed $V_A$, or around the speed P2, above the speed $V_B$.

Figure 5:
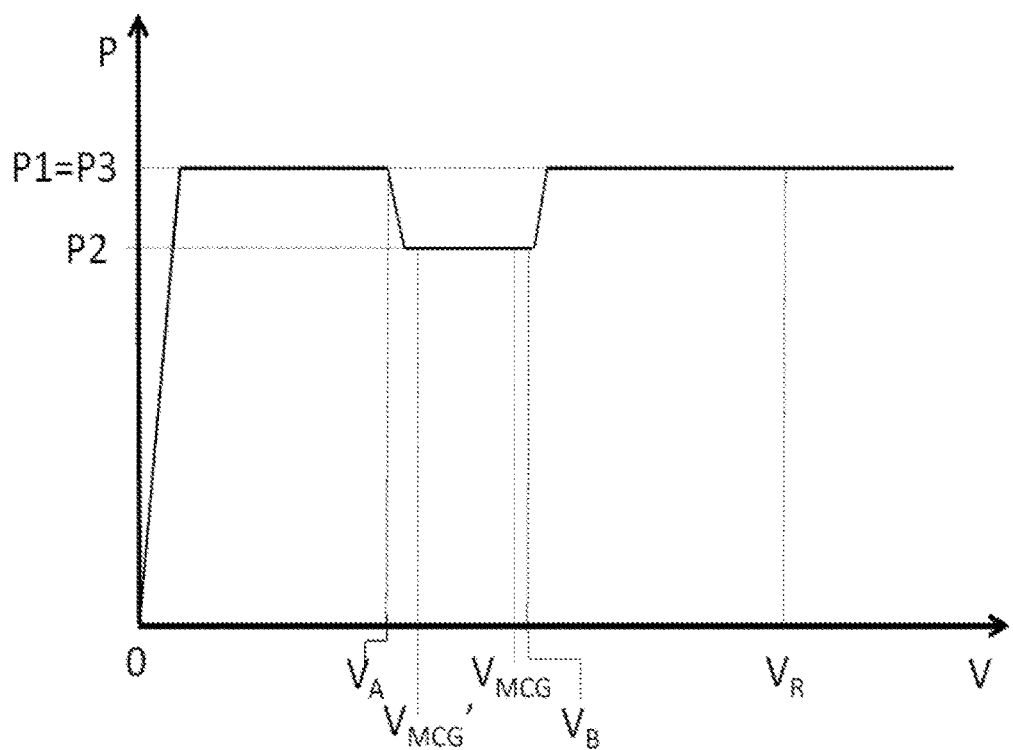
FIG. 5 schematically represents the thrust level of the jets as a function of the speed of the aircraft, during the implementation of the control method illustrated by FIG. 3.

Moreover, the transition between two thrust levels of the jets, for example between the thrust level P1 and P2, is necessarily progressive, the dynamics of the jet not allowing an instantaneous change. Thus, in practice, passage from the thrust level P1 to the level P2 takes place progressively in a few seconds, between the moment at which the aircraft reaches the speed $V_A$ and the moment at which it reaches the speed $V_{MCG}'$ associated with the thrust level P2. Likewise, passage from the thrust level P2 to the level P3 takes place progressively in a few seconds, after the moment at which the aircraft reaches the speed $V_B$. This evolution of the thrust level is represented schematically by the curve of FIG. 5, which represents the thrust level P of the jets as a function of the speed V of the aircraft, during the implementation of this method.

Figure 6:
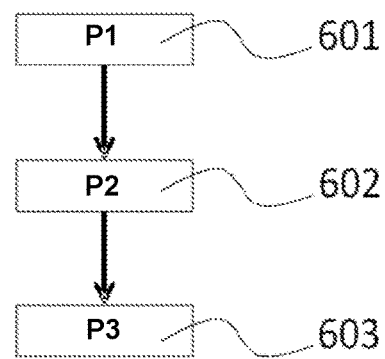
FIG. 6 schematically represents the steps of the method of controlling the thrust of the jets, illustrated by FIG. 3.

FIG. 6 represents the various steps of the method of controlling the thrust of the jets, in the embodiment represented by FIG. 3. In the course of a first step 601 of the method, the thrust level is brought to the value P1, preferentially equal to the nominal thrust level TO/GA, so as to accelerate the aircraft to the speed $V_A$. When the aircraft reaches the speed $V_A$ the thrust level decreases, in the course of the second step 602 of the method, to the value P2, before the aircraft reaches the speed $V_{MCG}'$ associated with this thrust level P2. When the speed of the aircraft has exceeded the speed $V_{MCG}$ associated with the thrust level P3 (which is here equal to P1) and has reached the speed $V_B$, the thrust level P is increased to the value P3, in the course of the third step 603 of the method. As indicated previously, it is possible in another embodiment of the disclosure herein not to implement this third step 603.

In a preferential manner, to obtain a noticeable optimization of the maximum weight on takeoff MTOW, the thrust level P2 lies between 80% and 95% of the thrust level P1.

In an advantageous manner, the device for controlling the thrust according to an embodiment of the disclosure herein comprises or consists of a computer onboard the aircraft, and able or configured to control the power of the jets of the aircraft. This device also comprises a computational program implemented by this computer, and able or configured to control the thrust of the jets of the aircraft according to a control method according to an embodiment of the disclosure herein. A suitable control in the flight deck allows the pilot to choose whether he wishes to control the thrust of the jets, for takeoff, according to a method of control according to an embodiment of the disclosure herein, or with according to a method of control of the prior art.

The subject matter disclosed herein can be implemented in or with software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the disclosure herein(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A control method of controlling thrust of jets of a multi-jet aircraft, during an aircraft takeoff phase, comprising successive steps of:
   a first step of controlling the jets to a first thrust level, until the aircraft reaches a first predetermined speed; and
   a second step of controlling the jets to a second thrust level, less than the first thrust level, when the aircraft reaches the first predetermined speed,
   wherein the first predetermined speed is less than a minimum ground control speed at the second thrust level.

2. The control method according to claim 1, comprising a third step of controlling the jets to a third thrust level, greater than the second thrust level, when the aircraft exhibits a speed greater than a second predetermined speed, the second predetermined speed being greater than the minimum ground control speed of the aircraft when the jets are at the third thrust level.

3. The control method according to claim 2, wherein the third thrust level is equal to the first thrust level.

4. The control method according to claim 1, wherein the first thrust level is equal to the maximum thrust level obtainable.

5. The control method according to claim 1 wherein the second thrust level is between 80% and 95% of the first thrust level.

6. A device for controlling thrust of jets of a multi-jet aircraft, during an aircraft takeoff phase, comprising:
   a computer onboard the aircraft and configured to control thrust level of the jets of the aircraft,
   a computational program implemented by the computer and configured to control the thrust level of the jets of the aircraft during an aircraft takeoff phase, by successive steps of:
      a first step of controlling the jets to a first thrust level, until the aircraft reaches a first predetermined speed; and
      a second step of controlling the jets to a second thrust level, less than the first thrust level, when the aircraft reaches the first predetermined speed,
   wherein the first predetermined speed is less than a minimum ground control speed at the second thrust level.

7. A multi-jet aircraft, comprising a device for controlling thrust of jets of a multi-jet aircraft, during an aircraft takeoff phase, comprising a computer onboard the aircraft and configured to control thrust level of the jets of the aircraft, comprising a computational program, implemented by the computer, and configured to control the thrust level of the jets of the aircraft, during an aircraft takeoff phase, by successive steps of:
   a first step of controlling the jets to a first thrust level, until the aircraft reaches a first predetermined speed; and
   a second step of controlling the jets to a second thrust level, less than the first thrust level, when the aircraft reaches the first predetermined speed,
   wherein the first predetermined speed is less than a minimum ground control speed at the second thrust level.

* * * * *